(12) United States Patent
Garcia Sayes et al.

(10) Patent No.: US 11,326,578 B2
(45) Date of Patent: May 10, 2022

(54) WIND FARM CONTROL SYSTEM AND ASSOCIATED METHOD

(71) Applicant: Nordex Energy Spain, S.A.U., Barasoain (ES)

(72) Inventors: Jose Miguel Garcia Sayes, Barasoain (ES); Guillermo Beriain Guembe, Barasoain (ES); Alberto Garcia Barace, Barasoain (ES); Javier Gil Guruceaga, Barasoain (ES); Daniel Ortiz Irigoyen, Barasoain (ES); Teresa Arlaban Gabeiras, Barasoain (ES); Alejandro Gonzalez Murua, Barasoain (ES); Ricardo Royo Garcia, Barasoain (ES); Miguel Nunez Polo, Barasoain (ES)

(73) Assignee: NORDEX ENERGY SPAIN S.A.U., Barasoain (ES)

( * ) Notice: Subject to any disclaimer, the term of this patent is extended or adjusted under 35 U.S.C. 154(b) by 0 days.

(21) Appl. No.: 16/731,594

(22) Filed: Dec. 31, 2019

(65) Prior Publication Data
US 2020/0220358 A1 Jul. 9, 2020

(30) Foreign Application Priority Data

Dec. 31, 2018 (EP) .................................... 18383010

(51) Int. Cl.
*F03D 7/02* (2006.01)
*F03D 7/04* (2006.01)
(Continued)

(52) U.S. Cl.
CPC .......... *F03D 7/0272* (2013.01); *F03D 7/0284* (2013.01); *F03D 7/0288* (2013.01); *F03D 7/048* (2013.01); *F03D 9/257* (2017.02); *H02J 3/381* (2013.01); *F03D 17/00* (2016.05); *H02J 2300/28* (2020.01)

(58) Field of Classification Search
CPC ...... F03D 7/0272; F03D 9/257; F03D 7/0284; F03D 7/0288; F03D 7/048; F03D 17/00; H02J 3/381; H02J 2300/28
See application file for complete search history.

(56) References Cited

U.S. PATENT DOCUMENTS

| | | | |
|---|---|---|---|
| 2010/0025994 A1* | 2/2010 | Cardinal | H02J 3/381 290/44 |
| 2020/0217299 A1 | 7/2020 | Garcia Sayes et al. | |

FOREIGN PATENT DOCUMENTS

| | | |
|---|---|---|
| EP | 2256341 A1 | 12/2010 |
| WO | 2012016585 A1 | 2/2012 |

* cited by examiner

*Primary Examiner* — Viet P Nguyen
(74) *Attorney, Agent, or Firm* — Hayes Soloway P.C.

(57) ABSTRACT

A control system and control method of a wind farm allows taking into account dynamic variations in the possibilities of reactive power generation of each wind turbine with respect to maximum reactive power generation capacities. The system is configured to receive from at least one first wind turbine of the wind turbines of the wind farm a maximum reactive power limit desired lower than a minimum reactive power capacity required. The system is configured to calculate the individual reactive power setpoints for each of the at least two wind turbines of the wind farm such that the individual reactive power setpoint for the at least one first wind turbine of the wind farm does not exceed the maximum reactive power limit desired.

23 Claims, 9 Drawing Sheets

(51) Int. Cl.
*F03D 9/25* (2016.01)
*H02J 3/38* (2006.01)
*F03D 17/00* (2016.01)

ated reactive power. This occurs both in the wind farm and in the wind turbine (the control systems of the wind farm and of each wind turbine are configured as previously specified).

WIND FARM CONTROL SYSTEM AND ASSOCIATED METHOD

CROSS-REFERENCE TO RELATED APPLICATIONS AND PRIORITY

This patent application claims priority from EP Patent Application No. 18383010.8 filed Dec. 31, 2018. This patent application is herein incorporated by reference in its entirety.

OBJECT OF THE INVENTION

The present invention relates to a control system and control method of a wind farm which allows taking into account dynamic variations in the needs and possibilities of reactive power generation of each wind turbine with respect to maximum reactive power generation capacities based on the active power they can generate at all times.

BACKGROUND OF THE INVENTION

Normally, grid integration regulations stipulate as a requirement for connecting a wind farm to a power grid having available, under any condition of generating active power less than or equal to the rated power of the wind farm, a minimum reactive power generation capacity required in the wind farm to offer support to the power grid in the control of the voltage thereof. This in turn translates into minimum reactive power generation capacities required of the wind turbines of the wind farm in an individual manner, and as they are equipped with power converters, they are converted into a suitable solution for addressing the requirements of the grid operator, minimising the need for connecting additional equipment in the sub-station. Said reactive power capacity is referred to as minimum reactive power capacity required.

Wind turbines have maximum electric capacities sized in turn by the minimum of the maximum capacities of the components of their electric drive (particularly generator and power converter). The maximum electric capacities are usually specified in terms of apparent power. Said maximum capacities provide an indication of the maximum active power and reactive power which the wind turbines can supply during a given time. Thus, there are often different values for the maximum rated electric capacity (i.e., that which can be sustained in a steady manner) than for transient maximum electric capacities (those which will only be sustained in a limited manner in time, for example, for less than ten minutes, one minute or several seconds). In turn, the maximum reactive power capacity required can be lower than the maximum reactive power capacity.

The rated apparent power S determines the rated steady active power and reactive power levels that the wind turbines can generate without exceeding the rated current of the electrical elements that are part of the electric drive (primarily generator and converter). It is usually calculated with a rated active power value P and a rated reactive power value Q according to the following expression:

$$S=\sqrt{P^2+Q^2} \quad (1)$$

In the state of the art, the rated reactive power and rated active power values determine the maximum active power and reactive power values which can be sustained in a steady manner, for which purpose those control systems responsible for calculating the active and reactive power setpoints of the wind turbines are configured so that said setpoints do not exceed said maximum values. That is, the control systems of the state of the art are configured such that the slow dynamics control loops will not calculate active power setpoints greater than the rated active power nor will they calculate reactive power setpoints greater than the rated reactive power. This occurs both in the wind farm and in the wind turbine (the control systems of the wind farm and of each wind turbine are configured as previously specified).

Generally, the rated reactive power in the wind farm coincides with a minimum reactive power capacity required which must be guaranteed for compliance with grid integration codes applicable at the point of connection of the wind farm to the power grid.

Reactive power is generally the control variable used for control of the voltage of the power grid. There are different control modes for controlling the voltage of the power grid, where it is generally the grid operator who specifies the most appropriate control mode in each case. Said operating modes coincide with different possible implementations in the control system of the wind farm for the control of reactive power:

control of reactive power based on reactive power references received directly from a remote control centre (remote control centre which can belong to the wind farm operator or to the power grid operator);

voltage control at a point of the power grid to which the wind farm is connected which, based on the voltage measurement taken at that point and on a voltage reference provided by the power grid operator (either directly or indirectly through the wind farm operator), calculates a global reactive power setpoint for the wind farm;

control of the power factor at a point of the power grid to which the wind farm is connected which, based on the active power measurement taken at that point and on a power factor reference provided by the power grid operator (either directly or indirectly through the wind farm operator), calculates a global reactive power setpoint for the wind farm;

Based on the power grid code or the control mode selected by the wind farm operator, the control system of the wind farm is configured to calculate a total reactive power setpoint for the wind farm which is later distributed in an individual manner among the different wind turbines to comply with the required setpoint. To that end, the control system of the wind farm calculates individual reactive power setpoints for the wind turbines which, when added together, amount to the total reactive power setpoint for the wind farm.

There are solutions in the state of the art in which the control system of the wind farm performs the distribution either equally among the wind turbines of the wind farm, or it sends different setpoints for the wind turbines of the wind farm taking into consideration thermal or electric loss criteria, but always without exceeding a pre-determined maximum reactive power capacity.

DESCRIPTION OF THE INVENTION

The present invention relates to a control system and control method of a wind farm which allows calculating individual reactive power setpoints for wind turbines, taking into account dynamic variations in the needs and possibilities of reactive power generation of each wind turbine with respect to maximum reactive power generation capacities for the purpose of optimising the active power production. The invention also relates to the wind farm comprising said control system of a wind farm.

In the case of a wind turbine, the rated apparent power is set in the same way as in the state of the art. According to the invention, however, the steady active power may exceed the rated active power, for which the generated reactive power will be less than the rated reactive power.

To that end, the present invention proposes a control system and a control method of a wind turbine configured to generate an active power greater than the rated active power without exceeding the limit set by the apparent power, by means of calculating a desired maximum reactive power limit less than the rated reactive power, i.e., less than the minimum reactive power capacity required of the wind turbine.

The maximum reactive power limit desired corresponds to the reactive power which can be generated without limitations in the active power. It is calculated based on an initial active power or torque setpoint to which electric limitations have not been applied and which is dependent on the operating conditions of the wind turbine (wind speed, temperature, capacity of the mechanical components) and on the rated apparent power. Said maximum reactive power limit desired is sent to a central wind farm control system for it to calculate a final reactive power setpoint, which once the maximum reactive power limits desired of each of the wind turbines with operating conditions that allow generating an active power greater than the rated active power have been taken into account, the control system will, send the final reactive power setpoint to each of them, in the attempt to keep it as close as possible to the available reactive power, without limitation, of each of them, i.e., to the respective maximum reactive power limits desired.

Once the final reactive power setpoint has been received, the control system of the wind turbine will calculate a final torque or active power setpoint for the wind turbine which, taking into account the capacity of the electric drive, assures that there is available reactive power capacity to comply with the final reactive power setpoint received from the control system of the global reactive power setpoint in the wind farm. To that end, it will apply a maximum limit to the torque or initial power setpoint based on the final reactive power setpoint received from the control system of the wind farm and based on the capacity of the electric drive.

In one embodiment, the steady reactive power can also exceed the rated reactive power.

In a wind farm there can be wind turbines with different operating conditions:

first wind turbines with operating conditions (wind speed and/or rotational speed, temperature of components, etc.) that give rise to initial active power or torque setpoints resulting from the control of the wind turbine which cannot be taken on without compromising the minimum reactive power capacities required, and second wind turbines with operating conditions (wind speed and/or rotational speed, temperature of components, etc.) that are such that the initial active power or torque setpoints resulting from the control of the wind turbine for said operating conditions can be taken on by the electric drive without compromising the minimum reactive power capacities required.

This would be the case in situations in which the operating conditions of the second wind turbines are such that they cannot generate an active power greater than the rated active power (active power which can be generated in a sustained manner and simultaneously with the rated reactive power) and therefore be taken on by the electric drive without compromising the minimum reactive power capacities required, whereas the operating conditions of the first wind turbines are such that they can generate an active power greater than the rated active power provided that the capacity of the electric drive is assured to that end.

For that purpose, the control system of at least one first wind turbine is configured to calculate a maximum reactive power limit desired which is a function of the initial active power or torque setpoint and of the capacity of the electric drive, and sending said maximum reactive power limit desired to the control system of the wind farm.

This allows dedicating the highest possible fraction of the set of electric capacities (apparent power) of the wind farm to the active power generation such that given favorable wind conditions, the at least one first wind turbine may exceed the rated active power level.

In order to satisfy a global reactive power setpoint of the wind farm, avoiding the necessity to limit the initial active power or torque setpoints resulting from the control of the first wind turbines, the control system of the wind farm is configured such that it can calculate the individual reactive power setpoints taking into account for the at least one first wind turbine at least one maximum reactive power limit desired.

In the case of the first wind turbines, taking into account that the operating conditions of said wind turbines are such that they may exceed the rated active power level (that which can be provided in a sustained manner at the same time as the rated reactive power level), the maximum reactive power limit desired is lower than the maximum reactive power capacity required (which is equal to the rated reactive power in one embodiment).

The present invention refers to a control system of a wind farm comprising at least two wind turbines, where the system is configured to:

calculate a global reactive power setpoint for the reactive power to be generated by the at least two wind turbines of the wind farm at the point of connection of the farm to the power grid;

calculate individual reactive power setpoints for each of the at least two wind turbines of the wind farm such that they add up to the global reactive power setpoint;

receive from at least one first wind turbine of the wind turbines of the wind farm a maximum reactive power limit desired lower than a minimum reactive power capacity required; and calculate the individual reactive power setpoints for each of the at least two wind turbines of the wind farm such that the individual reactive power setpoint for the at least one first wind turbine of the wind farm does not exceed the maximum reactive power limit desired.

Optionally, the maximum reactive power limit desired lower than a minimum reactive power capacity required is dependent on an initial active power setpoint of the at least one first wind turbine.

Optionally, the system is additionally configured to receive from at least one second wind turbine of the wind turbines of the wind farm a maximum reactive power limit possible greater than a minimum reactive power capacity required.

Preferably, the maximum reactive power limit possible greater than a minimum reactive power capacity required is dependent on an initial active power setpoint desired of the at least one second wind turbine.

Optionally, the system is additionally configured to set a first reactive power limit for each of the wind turbines chosen from the maximum reactive power limit desired and the minimum reactive power capacity required, with the one chosen being the lowest in absolute value.

In this first embodiment, the first reactive power limit will take one of the following possible values:

For the first wind turbine, the operating conditions are such that a reactive power value less than the minimum reactive power capacity required by the grid operator and equal to the maximum reactive power limit desired can exceed the maximum active power.

For the second wind turbine, the operating conditions are such that a reactive power value equal to the minimum reactive power capacity required by the grid operator cannot exceed the maximum active power.

Optionally, the system is additionally configured to set the first reactive power limit for the at least one second wind turbine of each of the wind turbines of the wind farm equal to the maximum reactive power limit possible.

In this second embodiment, the first reactive power limit will take one of the following possible values:

For the first wind turbine, the operating conditions are such that a reactive power value lower than the minimum reactive power capacity required by the grid operator and equal to the maximum reactive power limit desired can exceed the active power maximum For the second wind turbine, the operating conditions are such that a reactive power value greater than the minimum reactive power capacity required by the grid operator and equal to the maximum reactive power limit possible cannot exceed the active power maximum.

The wind turbines with active power generation conditions that are below the corresponding limits of the electric drive may thereby compensate, at least in part, for the reactive power which the wind turbines with a maximum power limit desired that is below the minimum reactive power capacity required no longer generate, thereby maximising the fraction of the capacity of the electric drive intended for the active power generation in said wind turbines, and accordingly, the active power generated by the wind farm. In the case of the first embodiment, the compensation will be less, and therefore the potential to maximise the active power generated by the wind farm will be lower than in the second embodiment.

There is provided according to the invention a control system in which the control of reactive power uses reactive power generation limits for each wind turbine which are dynamically updated according to the available reactive power generation capacities of each wind turbine which are calculated taking into account the active power operating conditions of each of the wind turbines. The control system of the wind farm will return to each wind turbine a setpoint suitable for each of them, complying with the global reactive power setpoint of the farm, respecting the capacities of the electric drive of each of the wind turbines and indirectly maximising the active power of the wind farm.

In certain conditions, the individual reactive power setpoints finally sent to the wind turbines will be less than the maximum reactive power limits desired for the first wind turbines, in which case the active power of the farm will be maximised. As the reactive power generated by the wind turbines with operating conditions that are such that the active power is below the corresponding (steady, transient or dynamic) active power limits is maximised, the reactive power setpoints for the wind turbines with operating conditions that are more favorable for active power generation will be lower.

For each one of the two previous embodiments, the control system of a wind farm may also be configured to calculate an initial reactive power setpoint for each of the wind turbines less than or equal to the first reactive power limit. Preferably, this may be carried out in a manner proportional to the first reactive power limit of each wind turbine and inversely proportional to the sum of the first reactive power limits of each of the wind turbines. Furthermore, the system is configured to compare the global reactive power setpoint with the summation of the initial reactive power setpoints for each wind turbine, and if the summation of the initial reactive power setpoints for each wind turbine is less than the global Q setpoint, calculating a correction term for each of the initial reactive power setpoints. Optionally to the latter, the system is configured to calculate a final reactive power setpoint for each wind turbine from the initial reactive power setpoint for each wind turbine and the correction term. This calculation of the correction term may be performed in a proportional manner.

In particular, this calculation of the correction term for each of the initial reactive power setpoints may be carried out in a proportional manner to the difference between the reactive power possible maximum limit and the reactive power desired maximum limit of each wind turbine.

Optionally, the system is additionally configured to calculate the global reactive power setpoint from a voltage control.

Optionally, the system is additionally configured so that the individual setpoints for each wind turbine do not exceed in any case their minimum reactive power capacity required.

Optionally, the system is additionally configured to receive from at least one of the wind turbines of the wind farm a maximum reactive power limit possible greater than a minimum reactive power capacity required. Preferably, the at least one maximum reactive power limit possible greater than a minimum reactive power capacity required is dependent on an active power setpoint desired. The system is additionally configured so that the maximum reactive power limit possible greater than a minimum reactive power capacity required does not exceed the at least one maximum reactive power limit desired.

The invention also refers to a control method of a wind farm comprising at least two wind turbines, wherein the method comprises the following steps:

calculating a global reactive power setpoint for the reactive power to be generated by the at least two wind turbines of the wind farm at the point of connection of the farm to the power grid;

calculating individual reactive power setpoints for each of the at least two wind turbines of the wind farm such that they add up to the global reactive power setpoint;

receiving from at least one first wind turbine of one of the wind turbines of the wind farm at least one maximum reactive power limit desired lower than a minimum reactive power capacity required; and calculating the individual reactive power setpoints for each wind turbine of the wind farm such that the individual reactive power setpoint for the at least one first wind turbine is as close as possible to the maximum reactive power limit desired.

Optionally, the at least one maximum reactive power limit desired lower than a minimum reactive power capacity required is dependent on an initial active power setpoint desired.

There is also proposed a control system and a control method of a wind turbine configured to calculate an initial active power setpoint based on which a maximum reactive power limit desired is calculated and sent to the control system of a wind farm, and receiving a final reactive power setpoint taking into account dynamic variations in the reactive power generation possibilities of said wind turbine with respect to maximum reactive power generation capacities. The invention also relates to the wind turbine comprising said control system of a wind turbine.

On the other hand, the wind turbine must be configured in a suitable manner in order to achieve the correct operation of the control method of the wind farm:

Thus, the wind turbine is configured to calculate, based on an initial torque (or power) control setpoint, a maximum reactive power limit desired which would allow not limiting the initial torque (or active power) control setpoint resulting from the control loops of the wind turbine and sending it to the control system of the wind farm. The initial torque (or power) control setpoint corresponds to a torque (or power) setpoint to which limitations associated with the capacities of the electric drive have not yet been applied; nonetheless, it can be limited based on capacities of mechanical components.

Said maximum reactive power limits desired will be taken into account, as far as possible, by the control system of the wind farm when distributing the reactive power setpoints among the different wind turbines of the wind farm required for meeting, on a global level, the reactive power generation requirements of the power grid operator associated for example with controls of voltage at the point of connection of the farm to the power grid.

PREFERRED EMBODIMENT OF THE INVENTION

Figure 1:
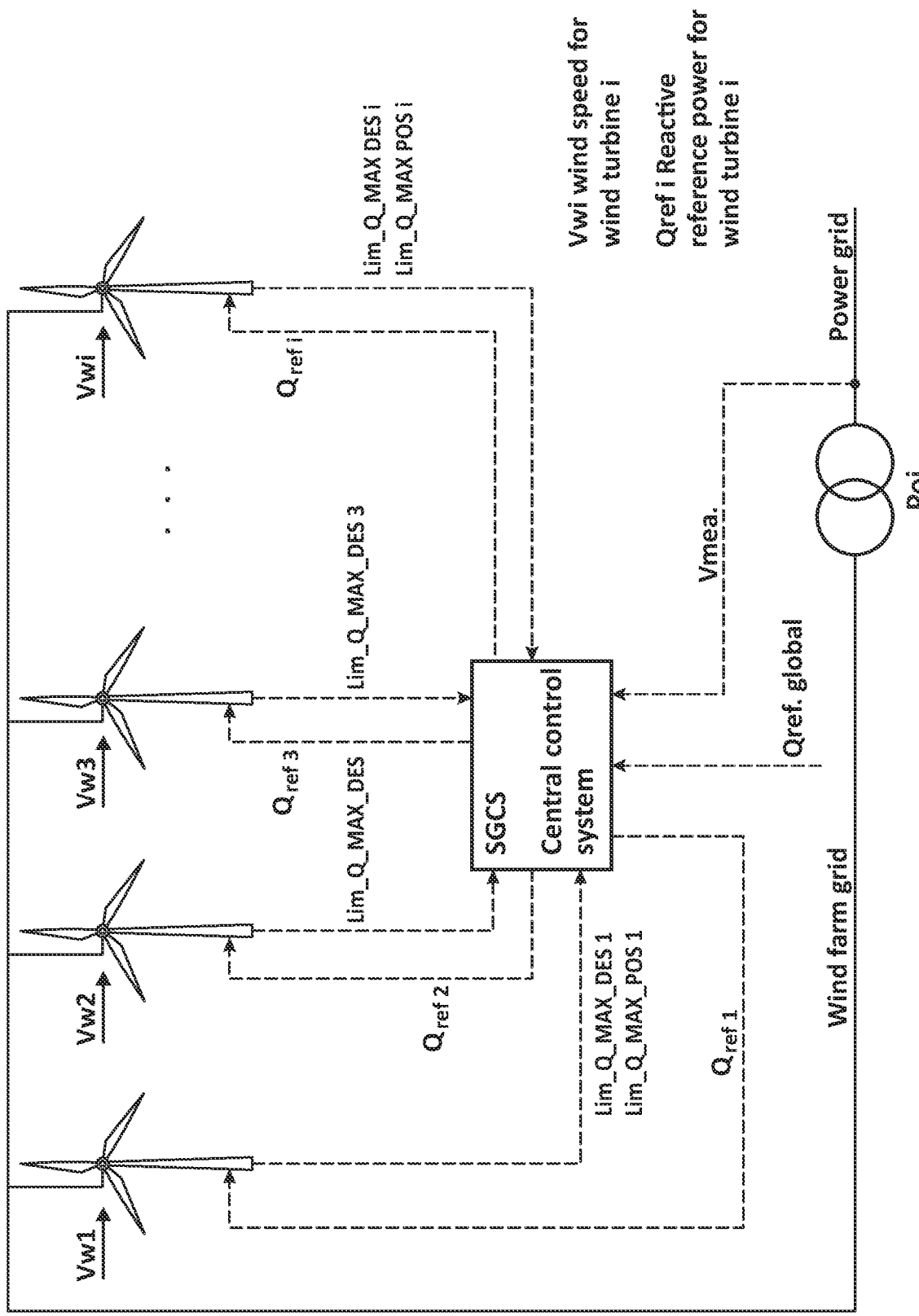
FIG. 1 shows a general diagram of the control system and control method of a wind farm of the present invention.

The control method of a wind turbine of the present invention will be described below in detail, where the wind turbine comprises:

FIG. 1 shows a general diagram of the control system and control method of a wind farm of the present invention. Said figure shows that, based on the operating conditions (wind speed of each $Vv\_1, \ldots, Vv\_i$, type of power curve enabled according to the mechanical limits, etc. . . . ), the wind turbines send to the control system of the wind farm SGCS information about reactive power generation needs (maximum reactive power limit desired, Lim_Q_max_des) and about reactive power generation possibilities (maximum reactive power limit possible, Lim_Q_max_pos) according to the available margin of the capacity of the electric drive and of the active power they can generate. The control system of the farm in turn sends to them, once said maximum reactive power limits desired and maximum reactive power limits possible have been taken into account, the individual reactive power setpoints Qref1, . . . , Qrefi to be generated by the at least two wind turbines of the wind farm which will respect, as far as possible and depending on the global power setpoint Qref_global (which can be received by the SGCS or calculated by it based on the voltage measured at the point of connection of the wind farm to the grid POI), the maximum reactive power limits desired for maximising active power production of the wind farm.

The global power setpoint Qref_global can be received by the SGCS or calculated by it based on the voltage measured at the point of connection of the wind farm to the grid POI or of the power factor, according to the control that has been enabled so as to comply with the grid integration code.

Thus, the control system of the wind farm of the invention is configured to:
calculate a global reactive power setpoint (Qref_global) to be generated by the at least two wind turbines of the wind farm at the point of connection of the farm to the power grid;
calculate individual reactive power setpoints (Qref1, . . . , Qrefi) for each of the at least two wind turbines of the wind farm such that they add up to the global reactive power setpoint (Qref_global);
wherein the system is additionally configured to:
receive from at least one first wind turbine of the wind turbines of the wind farm a maximum reactive power limit desired (Lim_Q_Max_Des) lower than a minimum reactive power capacity required of the wind turbine; and
calculate the individual reactive power setpoints (Qref1, . . . , Qrefi) for each of the at least two wind turbines of the wind farm such that the individual reactive power setpoint for the at least one first wind turbine of the wind farm does not exceed the maximum reactive power limit desired (Lim_Q_Max_Des).

Figure 2A:
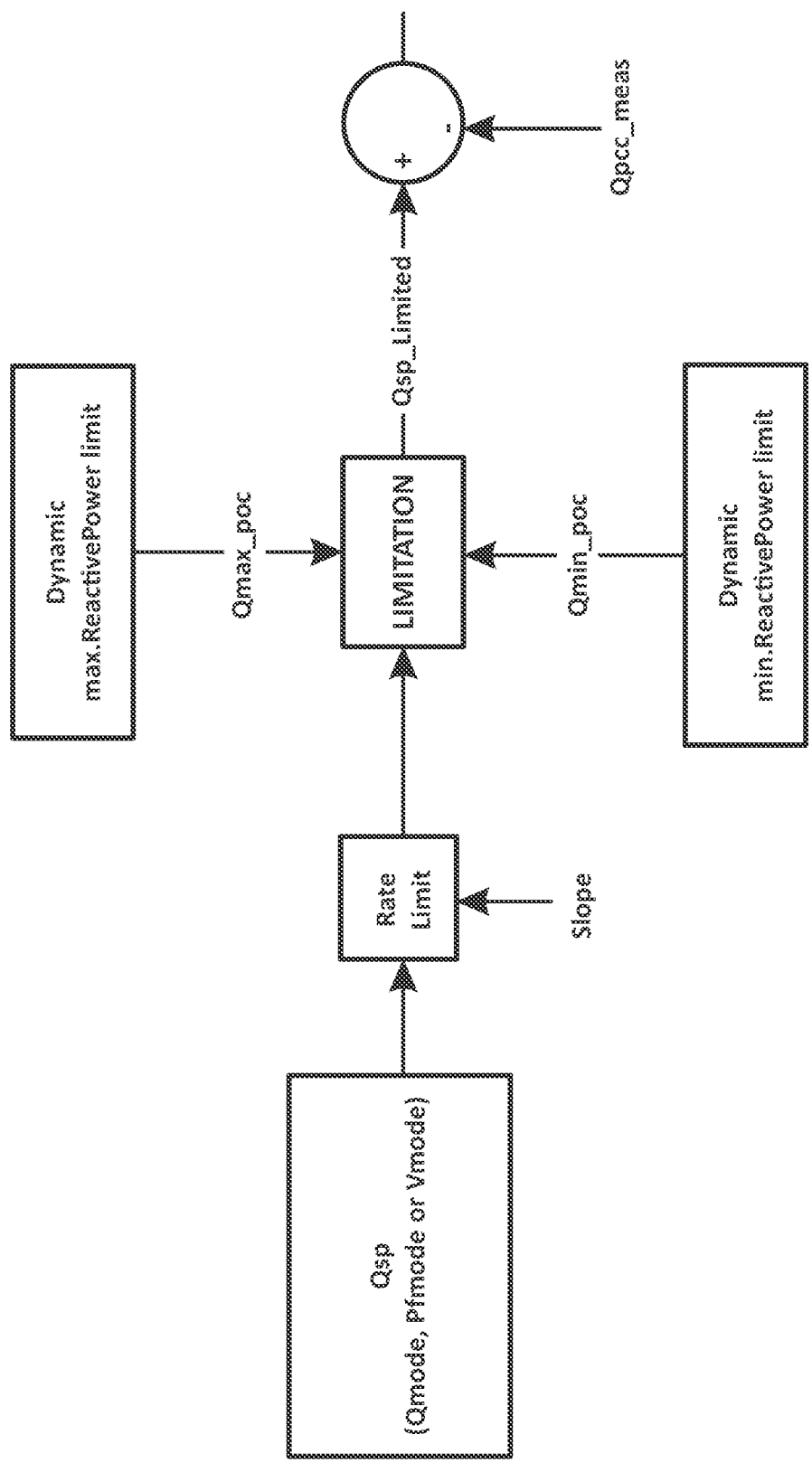
FIGS. 2A-2B show a block diagram of the control system and control method of a wind farm of the present invention.
Figure 2B:
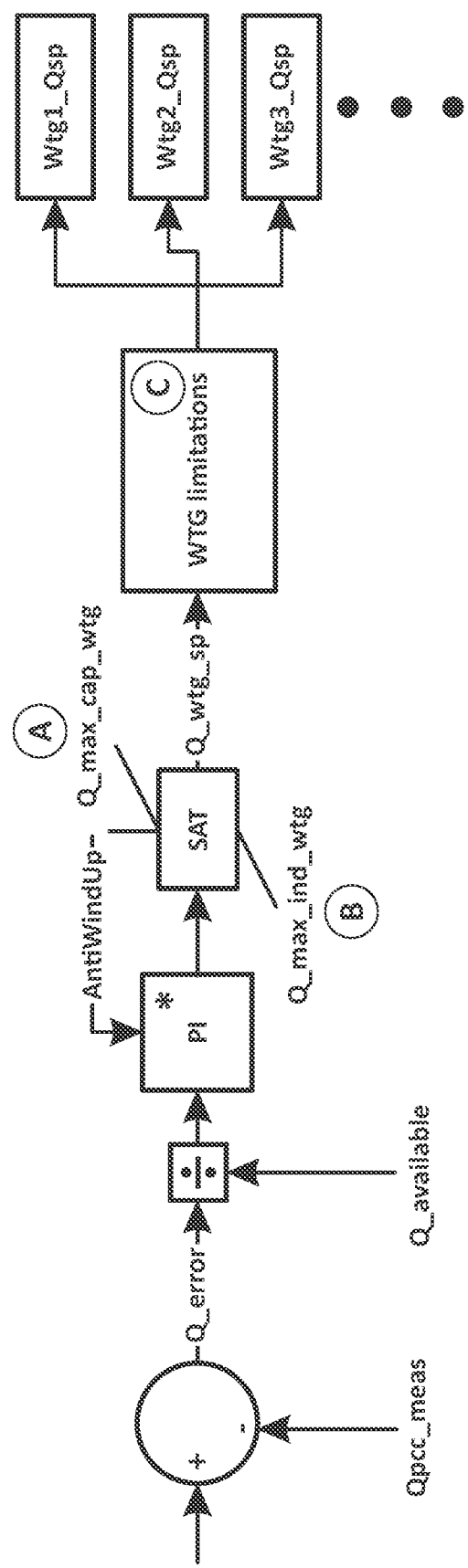

FIGS. 2A-2B show a block diagram of the control system and control method of a wind farm of the present invention. Block C includes the detail of the system for calculating individual reactive power setpoints (reactive power individual dispatching) which would correspond to FIGS. 3A-3C. The individual reactive power setpoint which is finally sent to the wind turbines Qrefi is a setpoint corrected Q_wtg_sp3 by means of adding the correction term Q_wtg_sp2 in FIGS. 3A-3C to a the setpoint initially calculated Qwtg_sp1, taking into account the maximum reactive power limits possible and the maximum reactive power limits desired of the wind turbines. If it is possible to comply with the global setpoint of the farm with this first Q setpoint, the correction term Q_wtg_sp2 will have null value.

In particular, the calculation of the correction term for each of the initial reactive power setpoints of each wind turbine may be carried out in a proportional manner to the difference between the reactive power possible maximum limit and the reactive power desired maximum limit of each wind turbine.

Figure 3A:
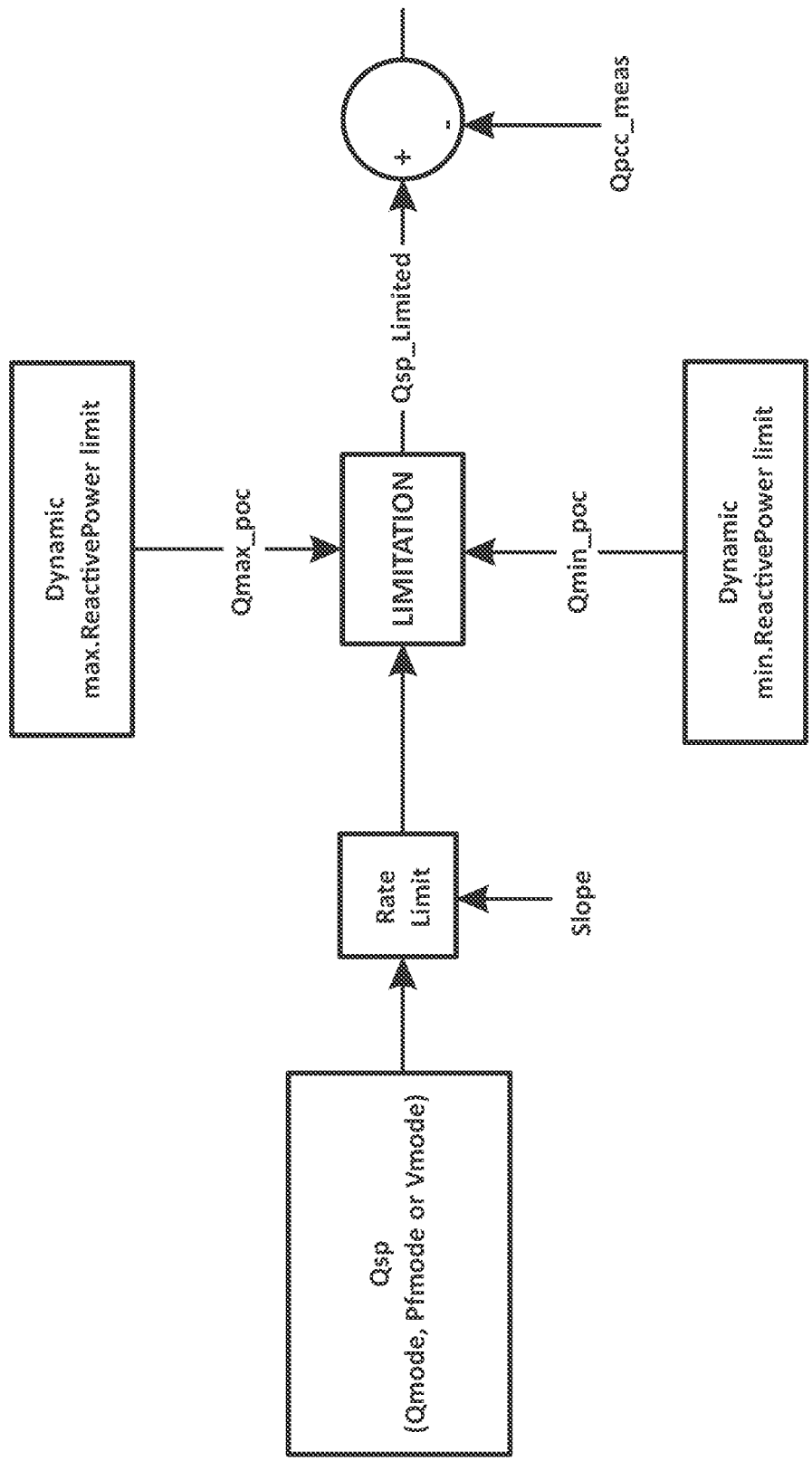
FIG. 3 shows a block diagram of the calculation of reactive power setpoints with the system and according to the control method of a wind farm of the present invention.
Figure 3B:
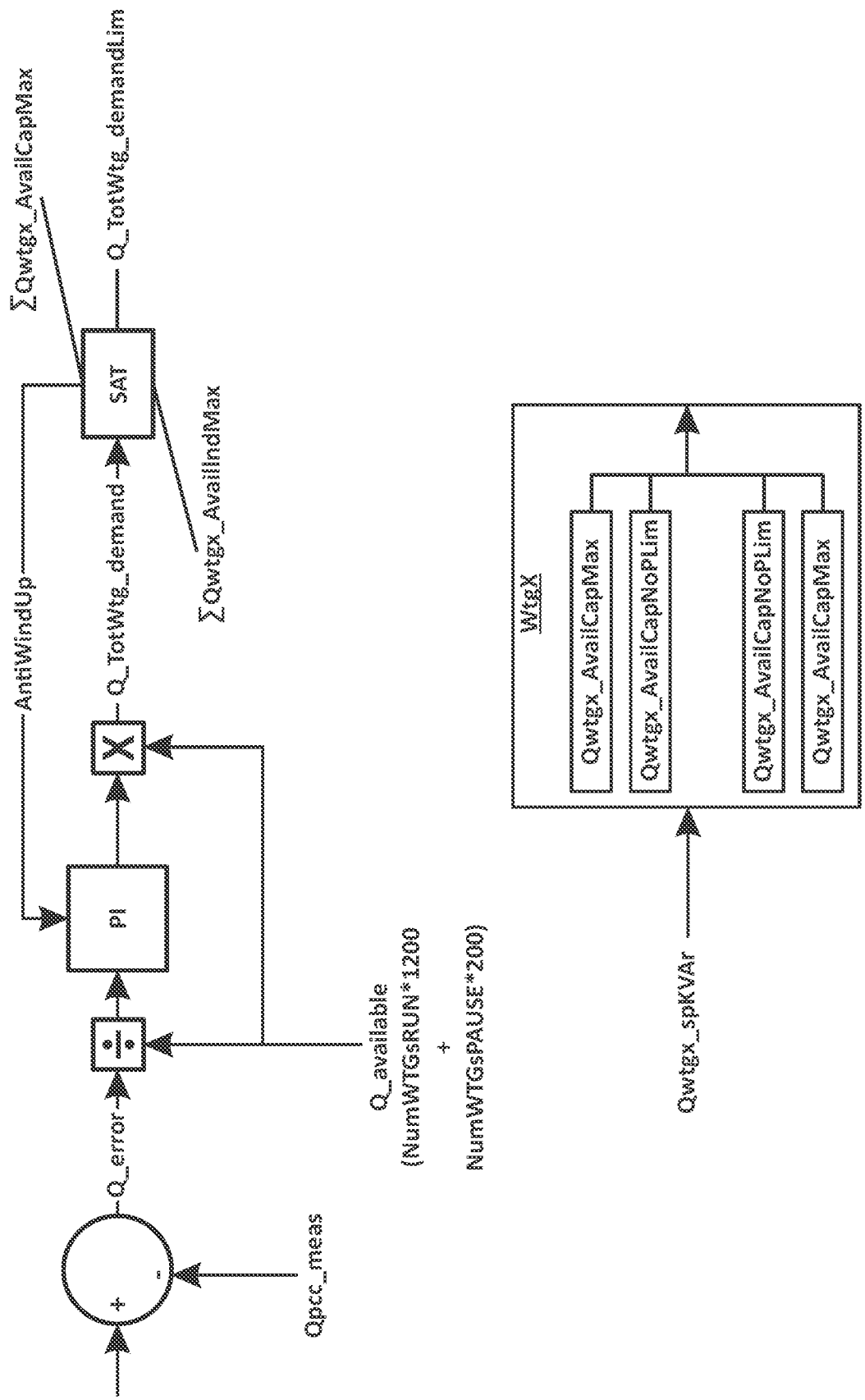
Figure 3C:
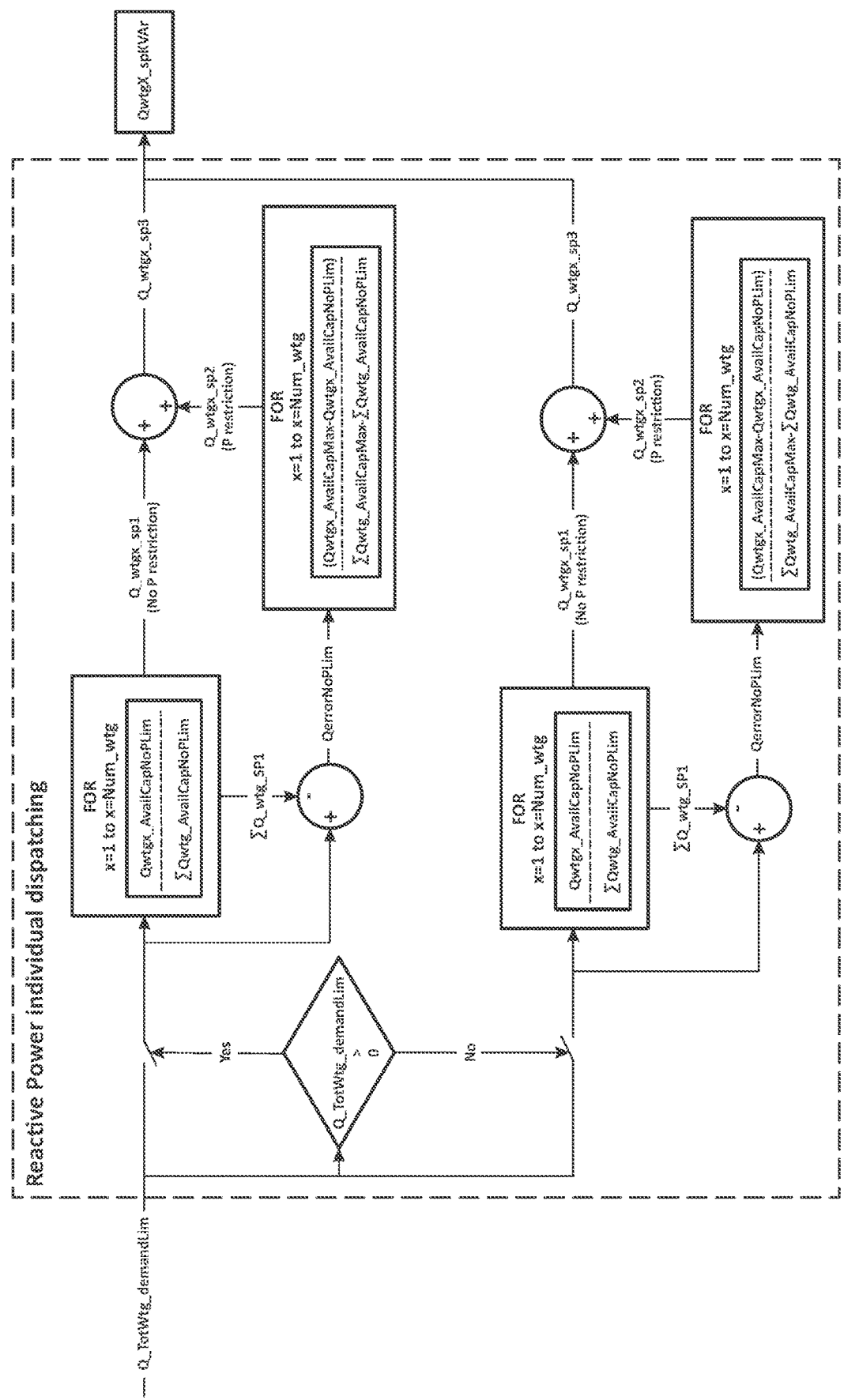

FIGS. 3A-3C show a block diagram of the calculation of reactive power setpoints with the system and according to the control method of a wind farm of the present invention. In said figure there are two branches for calculating the Q setpoints for the wind turbines, depending on whether the global setpoint meets an inductive Q (Q g<0) or capacitive Q (Q>0) need.

As can be seen in FIGS. 2A-2B and FIGS. 3A-3C, the control system of the wind farm of the invention is additionally configured to set at least one first reactive power limit (Qwtg_Avail_Cap_No P_Lim, Qwtg_Avail_Ind_No P_Lim,) for each of the wind turbines chosen from the maximum reactive power limit desired and the minimum reactive power capacity required, with the one chosen being the lowest in absolute value.

Since there are wind turbines with operating conditions that are such that they do not have the possibility of greater active power P generation, and therefore they do not have a maximum reactive power limit desired, two implementations are possible:

all the wind turbines send the maximum reactive power limit desired, the control system of the wind turbine setting for those which do not have greater active power generation capacity (Pref1<Prated) the minimum reactive power capacity required for the wind turbine as a value for the first reactive power limit; or only those the wind turbines that do have greater active power generation capacity (Pref1<Prated) send the maximum reactive power limit desired, in which case the wind farm control system sets the minimum reactive power capacity required for the wind turbine, value which it has stored for each of the wind turbines of the wind farm, as a value for the first reactive power limit.

Figure 6:
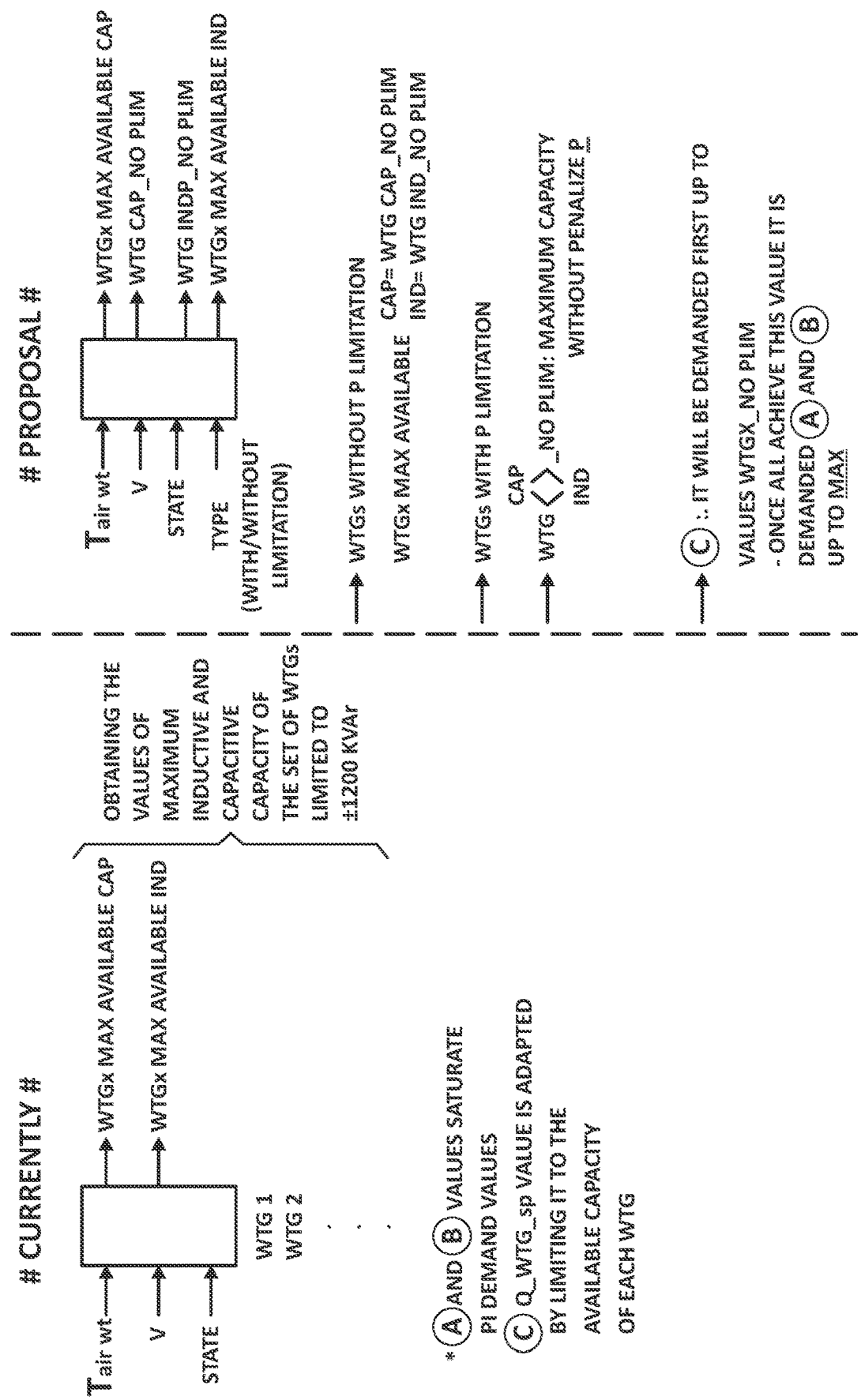
FIG. 6 shows a comparison between a control system and control method of a wind farm according to the state of the art and the control system and control method of a wind farm according to the present invention.

FIG. 6 shows a comparison between a control system and control method of a wind farm according to the state of the art and the control system and control method of a wind farm according to the present invention.

Figure 4:
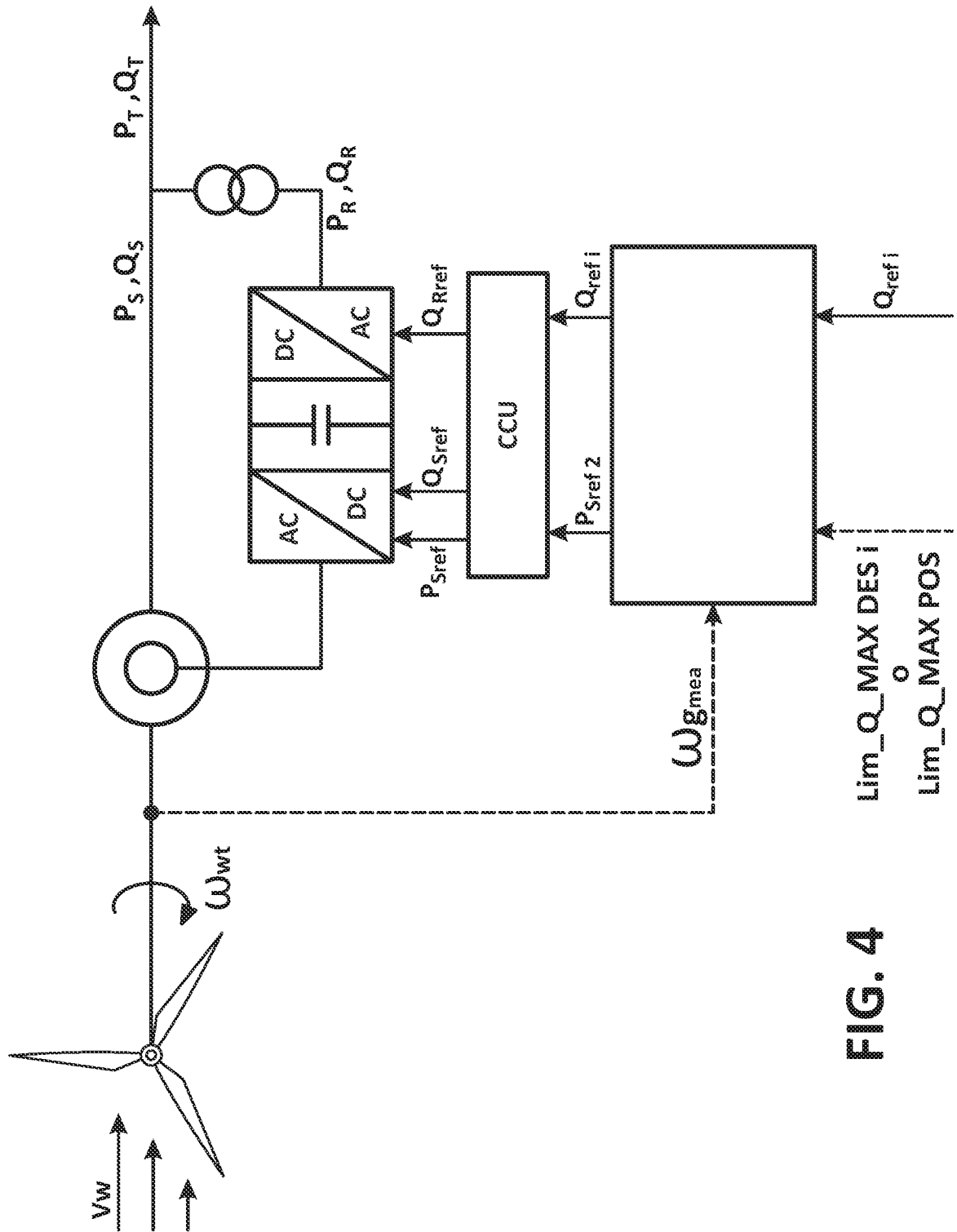
FIGS. 4 and 5 show a general diagram of the control system and control method of a wind turbine of the present invention.
Figure 5:
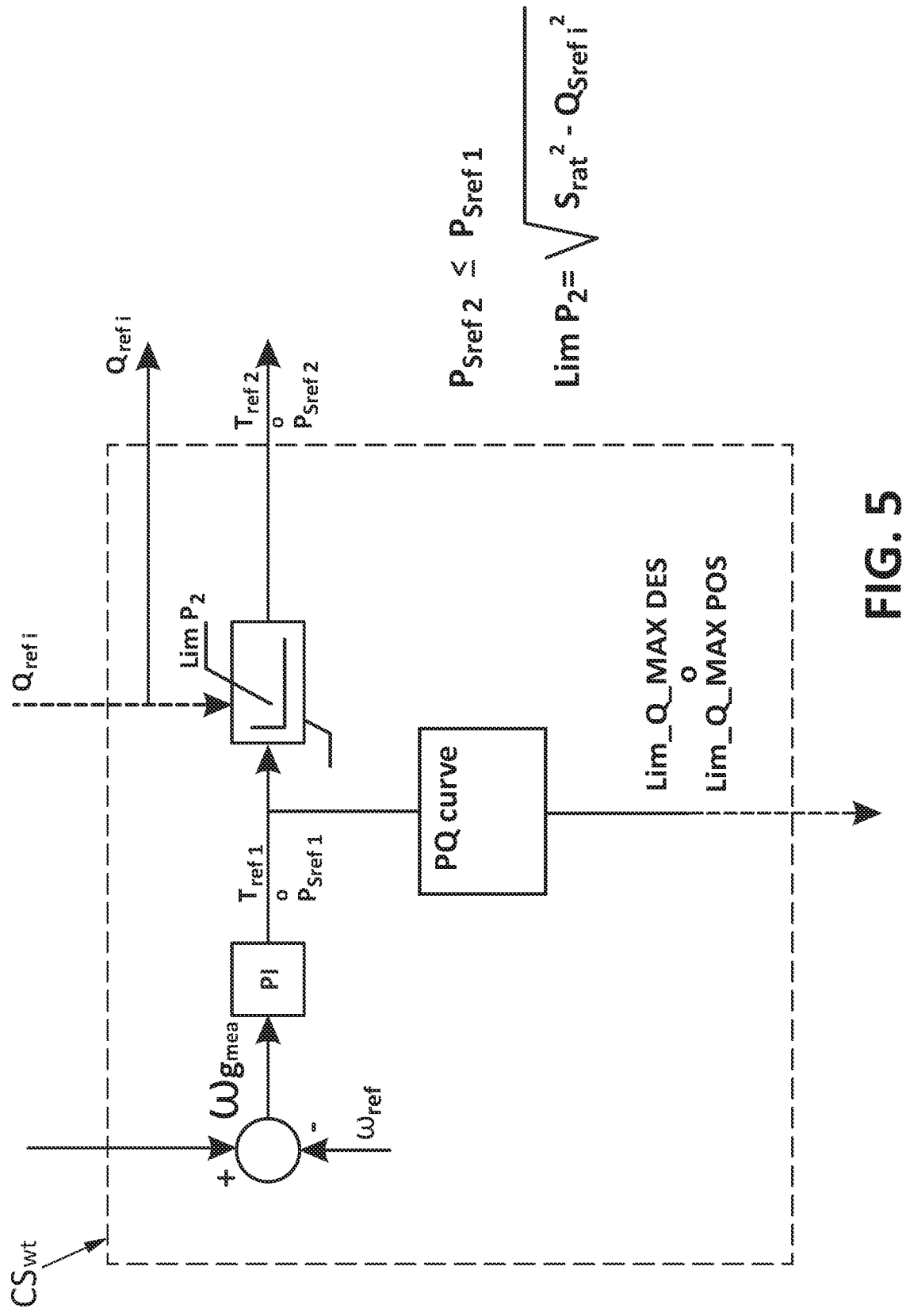

FIGS. 4 and 5 show a general diagram of the control system and control method of a wind turbine of the present invention.

Thus, the control system of the wind turbine is configured to calculate, based on an initial torque control Tref1 (or power Pref1) setpoint, a maximum reactive power limit desired (Lim_Q_Max_Des) which would allow not limiting the initial torque (or active power) control setpoint resulting from the control loops of the wind turbine and sending it to the control system of the wind farm. The initial torque (or power) control setpoint corresponds to a torque Tref1 (or power Pref1) setpoint to which limitations associated with at least one maximum electric capacity of a component of the electric drive (either of a generator or of a power converter) have not yet been applied; nonetheless, it can be limited based on the capacities of mechanical components.

This is because the generator and converter have different heating dynamics, with the power converter generally heating up more quickly than the generator, and therefore, they have a different capacity of withstanding currents greater than the rated current, capacity which will be dependent on the time when the current is greater than the rated current (which current can be withstood in steady-state).

In one embodiment, the step of calculating the maximum reactive power limit desired is performed when the operating conditions are such that the initial torque/active power control setpoint is greater than a maximum active power limit.

Depending on the control mode of the wind turbine (on the dynamics of the control loops of the wind turbine), i.e., the estimated time in which an above-normal active power is going to be generated (which may entail exceeding the at least one maximum electric capacity), permanent maximum electric capacities or transient maximum capacities both for the generator and for the converter will be used as a reference. In the particular case of slow dynamics corresponding to steady control, said maximum active power limit corresponds with the rated active power Prated.

If the control mode of the generator is such that an active power level which could cause the rated apparent power of the generator and/or converter to be exceeded in steady-state (i.e., a Pref1 such that sqrt(Pref^2+Qmax^2)>Srated) is allowed, the permanent maximum capacities of the generator and converter are used for calculating the at least one maximum reactive power limit desired.

The calculation will be performed as follows:

$$Lim\_Qmax\_des = sqrt(Srated^2 - Pref1^2)$$

The control method additionally comprises the following steps:

receiving a reactive power setpoint required Qrefi from a control system of the wind farm (SGCS)

calculating at least one maximum active power limit LimP2 based on:
a. The at least one maximum electric capacity (it will be either transient or permanent) in the operating conditions of the wind turbine
b. The reactive power setpoint received from the control system of the wind farm (SGCS) (Qrefi)

Applying at least one maximum active power limit calculated in the step prior to the initial torque/active power control setpoint desired for calculating a final torque/active power control setpoint (Tref2 or Pref2).

The at least one maximum active power limit LimP2 will be calculated in one embodiment as follows:

$$LimP2 = sqrt(Sperm^2 - Qrefi^2)$$

The reactive power setpoint Qrefi received from the control system of the wind farm (SGCS) will be sent to the control system of the power converter for the control of the generator.

If $P_T$ref1<Prated, it is calculated a Lim_Qmax_pos>(Qrated=wind turbine minimum required capacity). On the contrary, if the operation conditions are such that $P_T$ref1<Prated, it is calculated a Lim_Qmax_des<Qrated, in order to benefit from the electrical capacity to generate power.

The invention claimed is:

1. A control system of a wind farm comprising at least two wind turbines, wherein the system is configured to:
calculate a global reactive power setpoint for the reactive power to be generated by the at least two wind turbines of the wind farm at the point of connection of the farm to the power grid;
calculate individual reactive power setpoints for each of the at least two wind turbines of the wind farm such that they add up to the global reactive power setpoint;
receive from at least one first wind turbine of the wind turbines of the wind farm a maximum reactive power limit desired lower than a minimum reactive power capacity required;
calculate the individual reactive power setpoints for each of the at least two wind turbines of the wind farm such that the individual reactive power setpoint for the at least one first wind turbine of the wind farm does not exceed the maximum reactive power limit desired; and
receive from the at least one first wind turbines of the wind farm the maximum reactive power limit desired which corresponds to the reactive power generated, wherein the reactive power which can be generated is lower than the rated reactive power to generate an active power greater than the rated active power.

2. The system of claim 1, wherein the maximum reactive power limit desired lower than a minimum reactive power capacity required is dependent on an initial active power setpoint of the at least one first wind turbine.

3. The system of claim 1, wherein the system is additionally configured to receive from at least one second wind turbine of the wind turbines of the wind farm a maximum reactive power limit possible greater than a minimum reactive power capacity required.

4. The system of claim 3, wherein the maximum reactive power limit possible greater than a minimum reactive power capacity required is dependent on an initial active power setpoint desired of the at least one second wind turbine.

5. The system of claim 3, wherein the system is additionally configured to set a first reactive power limit for each of the wind turbines chosen from the maximum reactive power limit desired and the minimum reactive power capacity required, with the one chosen being the lowest in absolute value.

6. The system of claim 1, wherein the system is additionally configured to set a first reactive power limit for each of the wind turbines chosen from the maximum reactive power limit desired and the minimum reactive power capacity required, with the one chosen being the lowest in absolute value.

7. The system of claim 6, wherein the system is additionally configured to calculate an initial reactive power setpoint for each of the wind turbines less than or equal to the first reactive power limit.

8. The system of claim 7, wherein the system is configured to calculate the initial reactive power setpoint for each of the wind turbines, in a manner proportional to the first reactive power limit of each wind turbine and inversely proportional to the sum of the first reactive power limits of each of the wind turbines.

9. The system of claim 8, wherein the system is configured to compare the global reactive power setpoint with the summation of the initial reactive power setpoints for each wind turbine, and if the summation of the initial reactive power setpoints for each wind turbine is less than the global Q setpoint, calculating a correction term for each of the initial reactive power setpoints.

10. The system of claim 8, wherein the system is configured to calculate a final reactive power setpoint for each wind turbine from the initial reactive power setpoint for each wind turbine and the correction term.

11. The system of claim 10, wherein the calculation of the correction term is performed in a proportional manner.

12. The system of claim 1, wherein the system is configured to set a first reactive power limit for the at least one second wind turbine of each of the wind turbines of the wind farm equal to the maximum reactive power limit possible.

13. The system of claim 12, wherein the system is additionally configured to calculate an initial reactive power setpoint for each of the wind turbines less than or equal to the first reactive power limit.

14. The system of claim 1, wherein the system is additionally configured to calculate the global reactive power setpoint from a voltage control.

15. The system of claim 1, wherein the system is additionally configured so that the individual setpoints of reactive power for each wind turbine do not exceed in any case their minimum reactive power capacity required.

16. The system of claim 1, wherein the system is additionally configured to receive from at least one of the wind turbines of the wind farm at least one maximum reactive power limit possible greater than a minimum reactive power capacity required.

17. The system of claim 16, wherein the at least one maximum reactive power limit possible greater than a minimum reactive power capacity required is dependent on an active power setpoint desired.

18. The system of claim 17, wherein the system is additionally configured so that the maximum reactive power limit possible greater than a minimum reactive power capacity required does not exceed the at least one maximum reactive power limit desired.

19. A control method of a wind farm comprising at least two wind turbines, wherein the method comprises the following steps:
calculating a global reactive power setpoint for the reactive power to be generated by the at least two wind turbines of the wind farm at the point of connection of the farm to the power grid;
calculating individual reactive power setpoints for each of the at least two wind turbines of the wind farm such that they add up to the global reactive power setpoint;
receiving from at least one first wind turbine of one of the wind turbines of the wind farm at least one maximum reactive power limit desired lower than a minimum reactive power capacity required;
calculating the individual reactive power setpoints for each wind turbine of the wind farm such that the individual reactive power setpoint for the at least one first wind turbine is as close as possible to the maximum reactive power limit desired;
wherein in the step of receiving from at least one first wind turbine of the wind turbines of the wind farm at least one maximum reactive power limit desired, the at least one maximum reactive power limit desired corresponds to the reactive power which can be generated, wherein the reactive power which can be generated is lower than the rated reactive power to generate an active power greater than the rated active power.

20. The method of claim 19 wherein the at least one maximum reactive power limit desired lower than a minimum reactive power capacity required is dependent on an initial active power setpoint desired.

21. A control system of a wind farm comprising at least two wind turbines, wherein the system is configured to:
calculate a global reactive power setpoint for the reactive power to be generated by the at least two wind turbines of the wind farm at the point of connection of the farm to the power grid;
calculate individual reactive power setpoints for each of the at least two wind turbines of the wind farm such that they add up to the global reactive power setpoint;
receive from at least one first wind turbine of the wind turbines of the wind farm a maximum reactive power limit desired lower than a minimum reactive power capacity required;
calculate the individual reactive power setpoints for each of the at least two wind turbines of the wind farm such that the individual reactive power setpoint for the at least one first wind turbine of the wind farm does not exceed the maximum reactive power limit desired; and
receive from the at least one first wind turbine of the wind turbines of the wind farm the maximum reactive power limit desired which corresponds to the reactive power which can be generated, wherein the reactive power which can be generated is lower than the rated reactive power so that the steady active power exceeds the rated active power.

22. A control system of a wind farm comprising at least two wind turbines, wherein the system is configured to:
calculate a global reactive power setpoint for the reactive power to be generated by the at least two wind turbines of the wind farm at the point of connection of the farm to the power grid;

calculate individual reactive power setpoints for each of the at least two wind turbines of the wind farm such that they add up to the global reactive power setpoint;

receive from at least one first wind turbine of the wind turbines of the wind farm a maximum reactive power limit desired lower than a minimum reactive power capacity required;

calculate the individual reactive power setpoints for each of the at least two wind turbines of the wind farm such that the individual reactive power setpoint for the at least one first wind turbine of the wind farm does not exceed the maximum reactive power limit desired; and receive from the at least one first wind turbine of the wind turbines of the wind farm the maximum reactive power limit desired which corresponds to the reactive power which can be generated, wherein the reactive power which can be generated is lower than the rated reactive power thus generating an active power greater than the rated active power without exceeding the limit set by the apparent power.

23. A control system of a wind farm comprising at least two wind turbines, wherein the system is configured to:

calculate a global reactive power setpoint for the reactive power to be generated by the at least two wind turbines of the wind farm at the point of connection of the farm to the power grid;

calculate individual reactive power setpoints for each of the at least two wind turbines of the wind farm such that they add up to the global reactive power setpoint;

receive from at least one first wind turbine of the wind turbines of the wind farm a maximum reactive power limit desired lower than a minimum reactive power capacity required;

calculate the individual reactive power setpoints for each of the at least two wind turbines of the wind farm such that the individual reactive power setpoint for the at least one first wind turbine of the wind farm does not exceed the maximum reactive power limit desired; and receive from the at least one first wind turbine of the wind turbines of the wind farm the maximum reactive power limit desired which corresponds to the reactive power which can be generated, wherein the reactive power which can be generated is lower than the rated reactive power thus generating an active power greater than the rated active power based on a final reactive power setpoint calculated for each of the at least two wind turbines of the wind farm.

* * * * *